United States Patent

[11] 3,595,593

[72] Inventor Derek Lawrence Gold
 Cirencester, England
[21] Appl. No. 860,697
[22] Filed Sept. 24, 1969
[45] Patented July 27, 1971
[73] Assignee Gib Precision Limited
 Barton Lane, Cirencester County of
 Gloucester, England

[54] COLLETS
 3 Claims, 4 Drawing Figs.
[52] U.S. Cl. .................................................. 279/57,
 81/180 R, 269/281, 279/123
[51] Int. Cl. ........................................... B23b 31/20
[50] Field of Search ........................................ 279/123,
 122, 55, 57, 1 A, 1 ME, 1 SJ, 110; 269/280, 281;
 81/179, 180, 180 A, 180 B, 180 C, 180 D, 186

[56] References Cited
UNITED STATES PATENTS
2,346,706  1944  Stoner ............... 279/1 ME
2,817,535  1957  Linzell .............. 279/55
2,855,206  1958  Haviland ............ 279/1 ME Primary Examiner—Andrew R. Juhasz
Assistant Examiner—James F. Coan
Attorney—Merriam, Marshall, Shapiro & Klose ABSTRACT: A collet for use in gripping bars in machine tool operations, in which the bar-gripping jaws are spaced apart by spacing elements, themselves constructed as jaws applicable to the next largest size bar to be gripped.

COLLETS

BACKGROUND OF THE INVENTION

1. Field of the Invention

This invention relates to collets for use in gripping bars in machine tool operations, and wherein the collet is of the kind, herein called the kind specified, comprising at least three operative bar-engaging jaws spaced circumferentially around the central axis of the collet, the operative jaws being peripherally tapered so that when disposed within a correspondingly internally tapered chuck body and displaced in one direction relative to the chuck body along the axis of the collet, the operative jaws are forced into gripping engagement with the bar, with a jaw-spacing element disposed between each circumferentially adjacent pair of operative jaws, and means releasably securing together said operative jaws and jaw-spacing elements.

2. Description of the Prior Art

The present invention is based upon the fact that in practice any collet of the kind specified, is designed to grip bars of a very specific and limited size range, i.e. within a range of about 3 mm. between maximum and minimum diameter, and as commonly bars are supplied of diameters varying by increments of 3 mm. or in many cases less than about 3 mm. for example, 1.5 mm., and have an overall size within the range of about 4.5 mm. min. to more than 50 mm. max., a very large number of collets must be supplied, corresponding in number to the total number of bar sizes differing by increments of about 3 mm. between the minimum bar size and the maximum bar size above mentioned. This in practice is of the order of 20 different sizes of collet jaws.

In practice, within the foregoing size range and size number, only some three or four different sizes of chuck body are usually necessary, but no less than some 20 different jaw sizes are necessary, each jaw size corresponding to one of the large number of bar diameters above mentioned.

The present invention has for its object the provision of an improved construction of collet of the kind specified, in which an important economy in manufacturing and user cost is effected.

SUMMARY OF THE INVENTION

The present invention provides a collet of the kind specified, which is characterized in that the jaw-spacing elements are themselves each in the form of bar-engaging jaws each of dimensions applicable to the gripping of a bar of larger diameter than that to which the operative jaws are applicable, each jaw-spacing element having a peripheral taper similar to that of the operative jaws but being of a lesser radial thickness than that of the operative jaws so as to permit of the jaw-spacing elements being disposed within the same size of chuck body when utilized in the gripping of the larger diameter bar.

Insofar as the jaw-spacing elements are constructed as jaws applicable to a larger bar size and preferably the next larger bar size, necessarily the bar-engaging faces thereof will be spaced away from the bar which is gripped at the three positions by the operative jaws, so as in no way to interfere with the grip of the operative jaws.

At the same time, a very important economy is obtained in the construction of the collet, namely that the spacing elements which serve symmetrically to space the operative jaws are themselves capable of being used as jaws for gripping a larger and preferably the next larger size of bar, for which the same overall collet size can be used.

This economy is of considerable significance, since the cost of each jaw is of the order of 0.3 Sterling, in the case where the jaws are formed as has hitherto been customary with part-cylindrical concave gripping faces, so that in the simplest case where six jaws have hitherto been provided, the cost of the jaws is of the order of 2 Sterling per collet, and plainly if three of the six jaws are replaced by spacing elements capable of operating as jaws for the next larger size of bar, then in respect of the smaller size collet an economy of the order of 1 Sterling per collet can be effected, merely by providing spacing elements adapted to serve as jaws for next larger bar size.

Since in practice it is usually necessary for a complete range of collets to be supplied applicable to each bar size, with the total number of bar sizes of the order of 20 corresponding to no less than 20 different jaw sizes, then as except in the case of the largest bar size for each collet size, the spacing elements can serve as jaws for the next larger bar size, it will be appreciated that substantial economy indeed in the total number of jaws required for these 20 different bar sizes can be effected.

Indeed, overall it is believed that with the present invention an economy in the manufacturing costs of between 20 and 40 percent in respect of the customary range of collect sizes above-mentioned, can be effected.

In operation, when it is desired to change a collet from one bar size to the next larger bar size, then still utilizing the same chuck body, the operative jaws would be removed and replaced by jaw-spacing elements constituted by jaws corresponding to the next larger but one bar size, the effect of this operation being to render operative the spacing elements of the collet in the form applicable to the smaller size bar, and these original spacing elements would be replaced by jaws applicable to the still next larger bar size, when a still further increment in bar size is required.

The collet may be provided with either three or more than three, e.g. four operative jaws spaced symmetrically around the central axis of the collet, and spaced apart from one another by jaw-spacing elements, of which three or four in all are respectively provided, each constituted by jaws corresponding to the next larger bar size.

Whatever may be the number of operative jaws and spacing elements provided, the gripping face of each jaw, including the gripping face of the spacing elements which are to provide the jaws for the next larger bar size, may, with the present invention, be of the above-mentioned part-cylindrical concave configuration, as has been hitherto customary. Where the jaws and spacing elements are of the foregoing configuration, a substantial saving in manufacturing cost of the order above specified is obtained with the present invention, for the reasons already explained.

A still further saving in manufacturing cost can however be obtained in accordance with a further feature of this invention where, as is preferred each jaw and jaw-spacing elements are formed with a bar-gripping face of flat as opposed to part-cylindrical concave configuration, in that it becomes readily possible to form each jaw including the spacing elements which are to serve as jaws for larger bar sizes, in a considerably less expensive manner than has hitherto been possible.

This is because a very serious problem arises in grinding a part-cylindrical concave face on one of the two sides, namely, the inner side of the jaw and jaw-spacing element, where the opposite i.e. outer side is to be formed to tapered and in particular as is usually the case to frustoconical configuration, having regard to the high degree of accuracy to which collets must be made, if the bar is to be supported in the required accurate manner.

By forming one of the jaw faces, namely the bar-engaging face, as a flat or plane face, this can be ground very easily by supporting the jaw-forming body in a suitable jig which supports the outer, i.e. tapered and usually frustoconical face of the jaw and jaw-spacing element, using in the grinding of the flat bar-engaging face of the jaw and jaw-spacing element conventional grinding equipment.

Also, insofar as the inner face of each jaw is flat as opposed to being part cylindrical, each jaw, including the jaw-spacing elements can, it is believed, be made as a precision casting, so as thereby effecting a still further economy in manufacture.

Where the jaws as well as the jaw-spacing elements are each formed with flat bar-engaging faces, the overall economy in the manufacturing cost which it is believed can be effected with the present invention is considered to be of the order of between 30 and 50 percent in respect of the customary range of collet sizes above mentioned.

A further important advantage arising from providing the jaws and the jaw-spacing elements with flat bar-gripping faces will be understood from the fact that as at present constructed collets of the kind specified usually comprise at least six similar jaws, very commonly eight jaws, spaced symmetrically around the central axis of the collet, and each having a bar-engaging face, so that the collet is designed to grip the bar at a number of positions corresponding to the number of jaws spaced symmetrically around the periphery of the bar, the bar-engaging face of each jaw being of part-cylindrical configuration, with the axis of curvature coincident with or closely adjacent to the central axis of the clutch.

Commonly the radius of curvature of each cylindrical jaw face is made slightly greater than the radius of curvature of the bar to be gripped by the particular size of jaws appropriate to the maximum radius dimension of the bar to be gripped, so as to have substantially line contact between each jaw and the bar periphery.

Insofar as the collet embodies more than three jaws, each of which are adapted to have gripping engagement with the bar, for example six or eight jaws, it is in practice impossible to ensure that the gripping pressure is applied symmetrically to the bar, and that each of the jaws is uniformly loaded, so that the gripping pressure on one or more of the jaws may, in practice, be greater than the designed pressure, which means that each jaw must be so made to withstand without significant deformation a gripping pressure substantially higher than the theoretical maximum gripping pressure, assuming that the gripping load is borne equally by each of the jaws.

This last-mentioned disadvantage can readily be overcome by a further important preferred feature of this invention, that the collet is provided with only three operative jaws and three jaw-spacing elements spaced symmetrically around the collet axis.

By providing such three-position engagement between the bar and the three jaws which are spaced symmetrically around the collet axis, the bar is gripped in the most effective manner possible, namely by a three-position grip. Thus, where each jaw has a flat bar-gripping face and the three jaws provide three-position engagement with the bar, the efficiency of the grip permits of a further economy being made in the overall size of each jaw with consequent further economy in manufacture without loss of bar-gripping efficiency.

BRIEF DESCRIPTION OF THE DRAWINGS

One embodiment of the present invention is illustrated in the accompanying drawings, in which.

DESCRIPTION OF THE PREFERRED EMBODIMENT

Figure 1:
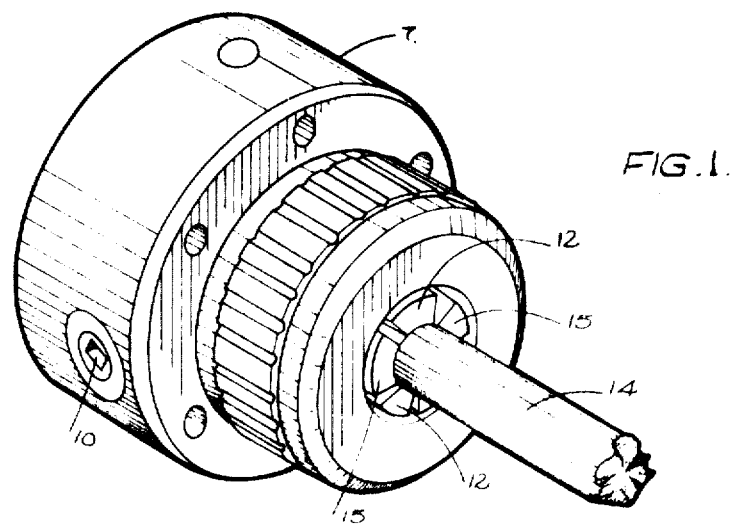
FIG. 1 is a perspective view of one form of bar-gripping chuck embodying a collet in accordance with this invention.
Figure 2:
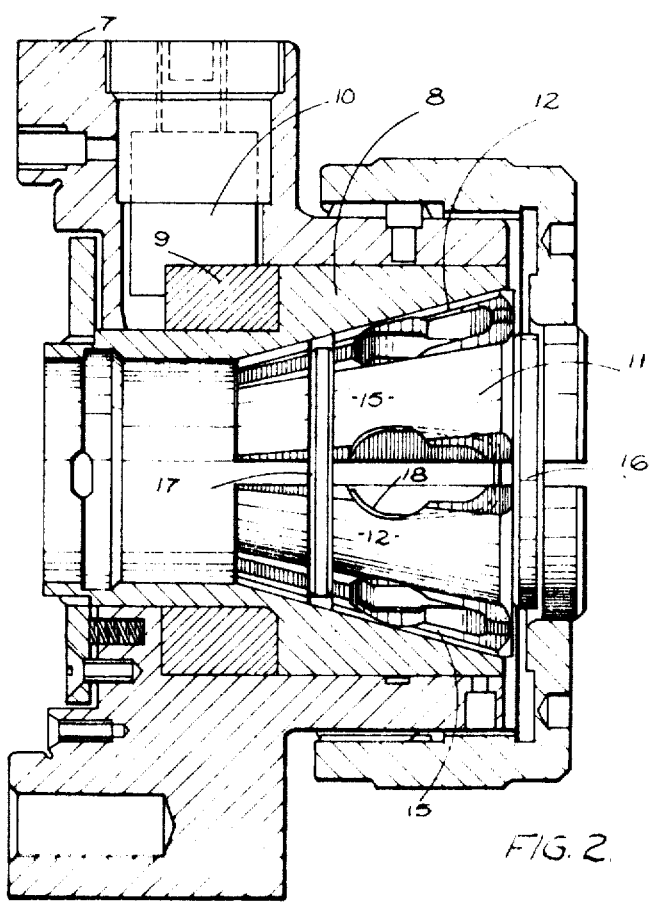
FIG. 2 is a part cross-sectional view of the chuck depicted in FIG. 1, FIGS. 3 and 4 are end and side elevations respectively of the collet, of the chuck shown in FIGS. 1 and 2 and constituting this invention

Referring to the drawings, the chuck depicted in FIGS. 1 and 2 comprises a chuck body embodying an outer substantially cylindrical casing 7 in which is mounted for axial sliding movement, a sleevelike jaw-closing member 8 which is displaced in manner known per se axially of the casing 7 by a deformable ring 9 engaged by a radially displaceable screw-threaded plunger 10 in threaded engagement with the casing 7.

The jaw-closing member 8 is of tapered, namely frustoconical configuration internally and receives a collet 11 of corresponding peripheral shape and embodying three operative jaws 12 spaced symmetrically around the central bore 13 of the collet which is to receive the bar 14. The collet 11 further embodies three jaw-spacing elements 15; there being a spacing element 15 disposed between each two circumferentially adjacent jaws 12, each spacing element 15 being in the form of a bar-engaging jaw of dimensions applicable to the gripping of a bar of larger diameter than the bar 14 to which the operative jaws 12 are applicable.

Figure 3:
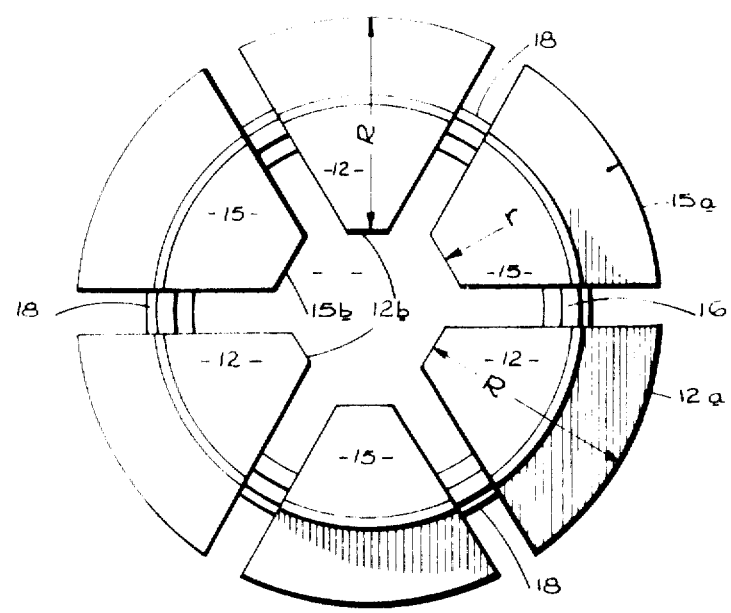

Each jaw-spacing element 15 has a frustoconical taper on its periphery 15a which is similar to that of the taper on the periphery 12a of the operative jaws 12 but is, as shown in FIG. 3, of a lesser radial thickness $r$ than the radial thickness $R$ of the operative jaws; the arrangement permitting of the jaw-spacing elements 15 being disposed within the same size of chuck body including the same size of jaw-closing member 8 when utilized in the gripping of the larger diameter bar.

Figure 4:
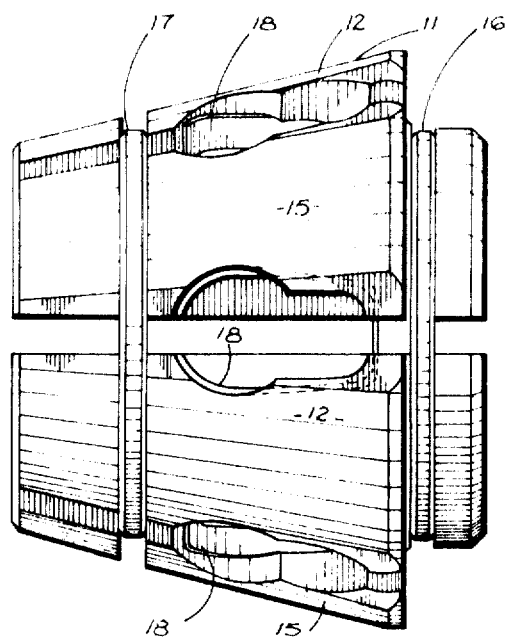

As appears from FIG. 4, the jaws 12 are held against outward movement by a pair of removable circlips 16, 17 and are resiliently urged outwardly into engagement with these circlips by springs 18 disposed between circumferentially adjacent jaws and spacing elements.

The circlips 16, 17 constitute means for releasably securing together the operative jaws and the jaw-spacing elements thus permitting of the above-described operation of utilizing the elements 15 as gripping jaws for the next largest bar size.

If desired, that circlip, namely the circlip 16, which is disposed adjacent one end of the jaws 12 and spacing elements 15, may be replaced by a plain annular ring, in that by removing merely the circlip 17, which extends around the frustoconical portion of the jaws 12 and spacing elements 15, it is then possible readily to disengage the ends of the jaws 12 and spacing elements 15 from the ring 16.

Each operative jaw 12 and each jaw-spacing element 15 is formed with a bar-engaging face 12b, 15b respectively, which is of flat form for the reasons earlier described.

As the collet 11 is of the usual frustoconical configuration peripherally and the jaw-closing member 8 in which the collet is disposed is of corresponding configuration internally, the per se known plunger 10 serves through ring 9 to displace the collet 11 axially relative to the outer member 8, so as to displace the jaws 12 in the known manner into gripping engagement with the bar 14. The arrangement is such that when the plunger 10 is operating it allows the displacement of the outer member 8 relative to the collet 11 in the opposite direction, and the jaws 12 and spacing elements 15 are urged relatively apart by the springs 18 to displace the jaws out of gripping engagement with the bar 14. The natural deformation of the ring 9 permits the outer member 8 to be forced by the spring-loaded collet to return to its original position.

Where a collet in accordance with the preferred form of this invention, provided with only three jaws 12, as shown, each having a flat bar-engaging face 12b so as to be so designed as to grip the bars at three positions only as above described, such a collet is not only particularly effective in gripping round bars, but is also similarly effective in gripping bars of hexagonal form in cross section. The latter is the commonest noncircular cross-sectional configuration employed for bars which are required to be subjected to a machining and other machine tool operation.

I claim:

1. A collet for use in gripping bars in machine tool operations and of the kind, herein called the kind specified, comprising at least three operative bar-engaging jaws spaced circumferentially around the central axis of the collet, the operative jaws being peripherally tapered so that when disposed within a correspondingly internally tapered chuck body and displaced in one direction relative to the chuck body along the axis of the collet, the operative jaws are forced into gripping engagement with the bar, with a jaw-spacing element disposed between each circumferentially adjacent pair of operative jaws, and means releasably securing together said operative jaws and jaw-spacing elements, characterized in that the jaw-spacing elements are themselves each in the form of bar-engaging jaws each of dimensions applicable to the gripping of a bar of larger diameter than that to which the operative jaws are applicable, each jaw-spacing element having a peripheral taper similar to that of the operative jaws but being of a lesser radial thickness than that of the operative jaws so as to permit of the jaw-spacing elements being disposed within the same size of chuck body when utilized in the gripping of the larger diameter bar.

2. A collet according to claim 1, characterized in that the bar-gripping faces of both the operative jaws and the jaw-spacing elements are each of flat configuration.

3. A collet according to claim 2, characterized in that the collet is provided with only three operative jaws and three jaw-spacing elements spaced symmetrically around the collet axis.